United States Patent Office 3,414,536
Patented Dec. 3, 1968

3,414,536
POLYPHENYLENE ETHERS STABILIZED WITH PHOSPHORAMIDES AND TETRA-ALKYLAMMONIUM-TETRAFLOUROBORATE
Klaus E. Holoch, Pittsfield, Mass., assignor to General Electric Company, a corporation of New York
No Drawing. Filed Jan. 18, 1967, Ser. No. 610,039
7 Claims. (Cl. 260—45.9)

ABSTRACT OF THE DISCLOSURE

A stabilized polyphenylene ether composition consisting of a major portion of a polyphenylene ether and a minor portion of a stabilizer consisting essentially of a hexaalkylphosphoric triamide and a tetraalkylammonium-tetrafluoroborate.

---

This invention relates to polyphenylene ether plastics, and more particularly to the stabilization of such plastics with a stabilizer consisting of a hexaalkylphosphoric triamide and a tetraalkylammonium-tetrafluoroborate.

It is known that the polyphenylene ethers, and particularly, the 2,6-dialkyl substituted polyphenylene ethers, are somewhat unstable under the influence of heat and light exposure causing the resin to become dark colored, brittle and undersirable for many commercial uses. The cause of the degradation is not fully understood, but is believed to be due, in part, to the presence of hydroxyl groups on the polymer chain, a sensitivity to oxygen containing atmospheres, and the degradative effects of traces of impurities in the resin composition.

The term "polyphenylene ether" includes those polymers disclosed and claimed in copending U.S. patent applications of Allan S. Hay, Ser. Nos. 212,127 and 212,128, now Patent Nos. 3,306,874 and 3,306,785 respectively; the polymers disclosed and claimed in U.S. Patents Nos. 3,257,357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, the polystyrenes, the polycarbonates, and the like, wherein the polyphenylene ether is present in an amount sufficient to effect the properties of the polymer composition due to the influence of heat and light.

Heretofore, a large number of different compounds such as the phenolic antioxidants exemplified by p-phenylphenol, N-steroyl-p-aminophenol and 2,2'-methylenebis-(4-ethyl-6-tertiary butyl phenol) have been used as heat and light stabilizers for the polyphenylene ethers. These stabilizers were generally unsatisfactory for even short exposures to heat. Other stabilizers such as the ketenes, benzoic anhydride and the mercaptobenzimidazoles have been tried and found to be effective for short periods of exposure to heat, but not for the relatively long exposures required for many commercial uses.

In copending U.S. patent application, Ser. No. 610,134, filed Jan. 1, 1967, it was disclosed that the addition of a small amount of a hexaalkylphosphoric triamide is a very effective stabilizer for the polyphenylene ethers when added in an amount varying between about 0.01 and about 10% by weight, calculated on the polymer. The hexaalkylphosphoric triamides may be represented by the following general formula:

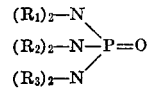

wherein $R_1$, $R_2$ and $R_3$ represent alkyl groups of from 1 to 6 carbon atoms.

It has now been found that a stabilizer combination of a hexaalkylphosphoric triamide and a tetraalkylammoniumtetrafluoroborate added to a polyphenylene ether results in a polymer having a much greater stability to heat and light as exemplified by a time to embrittlement increase of at least 100% as compared to a polyphenylene ether containing hexaalkylphosphoric triamide alone.

The tetraalkylammoniumtetrafluoroborate useful in the stabilizing combination of this invention may be represented by the following general formula:

wherein $R_4$ is an alkyl group having from 1 to 4 carbon atoms.

The quantity of stabilizer added to the polyphenylene ether depends upon the activity of the stabilizer, the quality of the polymer to be stabilized and the conditions to which the polymer is to be exposed. In general, the stabilizer may be added in an amount of between about 0.1 and about 10% by weight calculated on the polymer and preferably in an amount of between 1.0 and 6.0% by weight calculated on the polymer. The quantity of hexaalkylphosphoric triamide should be at least equal to the quantity of tetraalkylammoniumtetrafluoroborate and preferably should be used in an amount equal to twice that of the tetraalkylammoniumtetrafluoroborate. In a preferred embodiment of this invention, the hexaalkylphosphoric triamide ranges between 1.0 to 3.0% by weight, calculated on the polymer and the tetraalkylammoniumtetrafluoroborate ranges between 0.5 to 1.5% by weight, calculated on the polymer.

The manner of adding the stabilizer to the polyphenylene ether is not critical to this invention. Hence, any convenient method can be employed. For example, the stabilizer can be blended with resin powder in a blender such as a Waring blender. Alternatively, the resin can be dissolved in a suitable solvent and a stabilizer added to the solution. The stabilized polymer may then be recovered from solution.

The stabilized compositions of this invention are useful for all purposes for which the polyphenylene ethers have hitherto been used, for example, for conversion to films, fibers, molded articles and the like by conventional methods.

The following examples are set forth to illustrate the invention but are not intended to limit it thereto, the parts being by weight unless otherwise stated.

Three samples were prepared from a poly (2,6-dimethyl-1,4 phenylene) ether. The first was a control sample free of stabilizer, the second contained 2.0% hexamethylphosphoric triamide, and the third contained 2.0% hexamethylphosphoric triamide and 1.0% tetramethylammoniumtetrafluoroborate. All samples were prepared by blending the polymer in powder form with the stabilizer, where appropriate, in a Waring blender, extruding the mixture at a temperature of 550° F., chopping the extruded strand into pellets, preheating 2 gram samples of the pellets to a temperature of 550° F. for 1 minute and pressing the pellets at a pressure of 20,000 p.s.i. at 550° F. for 1 minute to form films. The films so prepared were allowed to cool and were cut into strips measuring 4 by 0.5 inches. The stabilized samples were evaluated by subjecting the film samples to heat aging in air circulating oven maintained at 175° C. and determining the time of embrittlement for each sample. This was determined by folding the samples at various times during the heat aging process until a film strip embrittled to a point where it snapped when partially folded. The following results were obtained.

TABLE 1

| Sample designation | Stablilizer composition | Time to embittle (hrs.) |
| --- | --- | --- |
| A | Control (no stabilizer) | 30 |
| B | 2.0% hexamethylphosphoric triamide | 65 |
| C | 2.0% hexamethylphosphoric triamide, 1.0% tetraalkylammoniumtetrafluoroborate | 200 |

Other compositions of this invention which would be expected to give comparable results to composition C of Table I include:

(D) Polyphenylene ether plus 2.0% hexaethylphosphoric triamide plus 2.0% tetramethylammoniumtetrafluoroborate.

(E) Polyphenylene ether plus 3.0% hexacyclohexylphosphoric triamide plus 1.0% tetrapropylammoniumtetrafluoroborate.

(F) Polyphenylene ether plus 4.0% hexapropylphoshoric triamide plus 2.0% tetraethylammoniumtetrafluoroborate.

It should be understood that the invention is susceptible to further modification within the scope of the appended claims.

What I claim as new and desire to secure by Letters Patent of the United States is:

1. A stabilized polyphenylene ether composition consisting essentially of a major portion of a polyphenylene ether and a stabilizing quantity of a stabilizer consisting essentially of:

(1) a hexaalkylphosphoric triamide having the general formula:

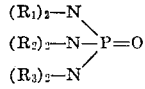

wherein $R_1$, $R_2$ and $R_3$ represent alkyl groups of from 1 to 6 carbon atoms and (2) a tetraalkylammoniumtetrafluoroborate of the formula:

wherein $R_4$ represents an alkyl group having from 1 to 4 carbon atoms.

2. The stabilized polyphenylene ether composition of claim 1 wherein the polyphenylene ether is a poly (2,6-dimethyl-1,4 phenylene) ether.

3. The stabilized polyphenylene ether composition of claim 1 wherein the stabilizer constitutes from 0.1 to 10% by weight of the composition, calculated on the polymer.

4. The stabilized polyphenylene ether composition of claim 1 wherein the stabilizer constitutes from 1.0 to 6.0% by weight of the composition, calculated on the polymer.

5. The stabilized polyphenylene ether composition of claim 1 wherein the stabilizer consists essentially of hexamethylphosphoric triamide and tetramethylammoniumtetrafluoroborate.

6. The stabilized polyphenylene ether composition of claim 1 wherein the hexaalkylphosphoric triamide constitutes from 1.0 to 3.0% by weight of the composition, calculated on the polymer and the tetraalkylammoniumtetrafluoroborate constitutes from 0.5 to 1.5% by weight of the composition, calculated on the polymer.

7. A stabilizer composition consisting of:

(1) a hexaalkylphosphoric triamide having the general formula:

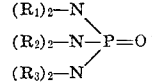

wherein $R_1$, $R_2$ and $R_3$ represent alkyl groups of from 1 to 6 carbon atoms and (2) a tetraalkylammoniumtetrafluoroborate of the formula:

wherein $R_4$ represents an alkyl group having from 1 to 4 carbon atoms.

References Cited

UNITED STATES PATENTS 3,100,197   8/1963   Heuck et al. _____ 260—40.9

DONALD E. CZAJA, *Primary Examiner.*

H. E. TAYLOR, JR., *Assistant Examiner.*